Sept. 6, 1927.
O. L. INGRAM
1,641,387
LIQUID LEVEL GAUGE
Filed Dec. 29, 1923
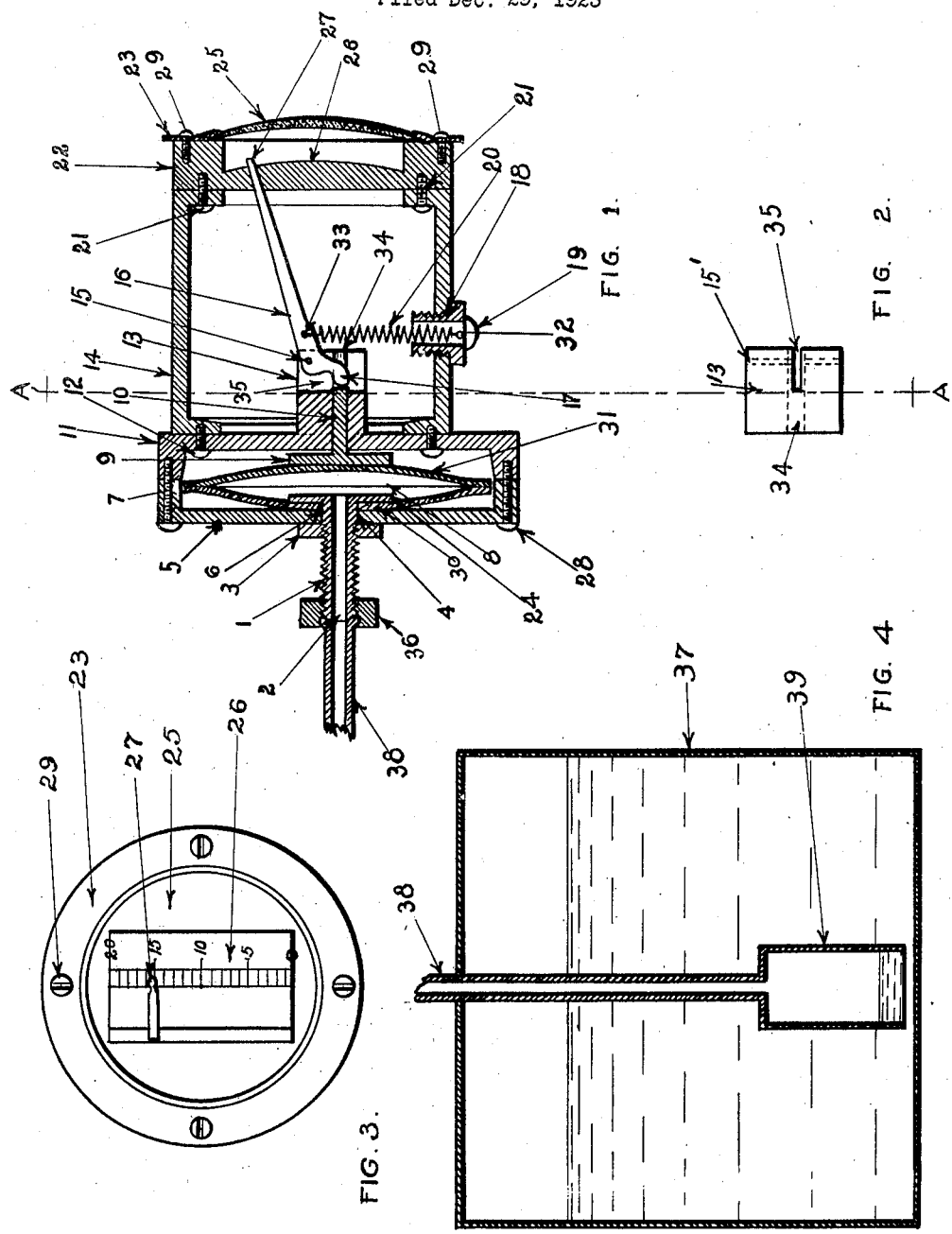
WITNESSES Mildred Curts.
Earl C. Wood
Oscar L. Ingram
INVENTOR
BY
ATTORNEY Patented Sept. 6, 1927.

1,641,387

UNITED STATES PATENT OFFICE.

OSCAR L. INGRAM, OF WALLA WALLA, WASHINGTON.

LIQUID-LEVEL GAUGE.

Application filed December 29, 1923. Serial No. 683,277.

My invention relates to gauges such as are used for the purpose of determining the amount of liquid in an inclosed tank such as the gasoline tank ordinarily carried by an automobile. One of the objects of my invention is to enable the user of the fuel to determine, to a high degree of accuracy at any time, the amount of fuel in the tank. A further object of my invention is to provide a gauge of the character described that will not be susceptible to error by reason of changes of temperature and to provide a gauge of this character that will not be liable to get out of order easily.

The invention consists of a gauge, including a diaphragm and an indicator actuated by the diaphragm, and a spring associated with the indicator for resisting the movement of the indicator. A pipe is connected with the diaphragm and to an air bell located in a fuel tank, whereby the fuel will rise in the air bell and the air in the pipe and air bell will be forced into the diaphragm to register the pressure on the gauge exerted by the liquid rising in the air bell.

It is well understood that in devices of this character the pressure per inch, i. e. the hydraulic head of the liquid, outside the air bell in a fuel tank is always at a balance with the pressure or hydraulic head of the liquid standing in the air bell, plus the resistance furnished by some sort of a resisting element usually embodied in the gauge itself. In many instruments this last mentioned resisting element is merely a colored liquid in a U-tube. In the usual instrument of this character it has been the custom to provide a resisting element in the gauge that would furnish a resistance that would about equal the resistance furnished by the liquid in the air-bell. In other words, the resistance balancing with the hydraulic head of the liquid outside the air-bell was furnished about equally by the liquid in the air-bell and the resisting element in the gauge. When this construction has been used an air-bell has been provided of comparatively small diameter; and it will of course be apparent that the smaller the diameter of the air-bell the greater the height the liquid therein must rise in order to give the necessary displacement of air from the air-bell into the gauge mechanism for the purpose of causing the desired registration. It will be understood that the expansion or the contraction of air in the air bell and air line from temperature changes, at a given temperature, will always add or subtract to the cubic contents of the air in the air-line, and it will of course be understood that this expansion or contraction of air and consequent changes in the cubic contents of the air-line must result in a fluctuation in the height of the liquid standing in the air-bell. This being true, it will be apparent that any considerable change of height of liquid in the air-bell is going to affect the registration of the gauge because the pressure exerted by the liquid in air-bell will vary as the height thereof varies while the pressure exerted by the liquid outside the air-bell and by the resisting element in the gauge will remain unaffected by the temperature.

When I provide an air-bell of such large diameter that the liquid need rise but slightly in the air-bell in order to get a sufficient displacement of air to cause a full registration of the gauge, it will be understood without further analysis that the expansion or contraction of air in the air-line will cause but small variation in the height of the liquid in the air-bell because the cross-sectional area of the air-bell is so large in comparison with the cross-sectional area of the air-line, that it can take care of the cubic displacement of air from the air-line into the air-bell, or vice versa, without any material change of the height of the liquid in the air-bell.

Now if the height of the liquid in the air-bell does not change materially from temperature the pressure exerted thereby will not change and therefore, my device is practically immune from error caused by changes of temperature, at least the error is so slight that it becomes negligible.

However, it would not be practicable to provide an air-bell of large cross-sectional area if we do not at the same time provide a spring so strongly tensioned that it will keep the liquid at a very low height in the air-bell. In order to obtain this very desirable result, I provide a spring so heavily tensioned that it will keep the liquid thus low in the air-bell, and in conjunction therewith I provide a diaphragm and other gauge mechanism all so related one to the other that I can get a complete and full registration and yet keep the liquid very low in the air-bell.

When I say that my spring is so strongly tensioned that it keeps the liquid low in the air-bell, I merely use a phraseology that is tersely descriptive of how strongly the spring must be tensioned.

I obtain these objects by the construction hereinafter described, and by new and novel arrangements of parts, and their relationship to each other.

Figure 1 is a vertical section of the main parts of the gauge,

Figure 2 is a view of a boss 13, from the top and through the line A—A,

Figure 3 is a front elevation of the face of the gauge and shows the calibrated member of the gauge and the indicating pointer, and Figure 4 is a view in section of the fuel tank, an air-bell and an air-line.

As shown in Figure 1 the main parts of my gauge comprise a diaphragm 8, an arm 16, having an indicating pointer 27, a disc 9, having a stem 10, which stem 10 is slidable through the bearing piece or boss 13; and a calibrated member 26.

In the construction of my gauge, I depart from the usual custom followed in making depth measuring instruments and provide a diaphragm 8 having walls of cloth-like flexibility, which diaphragm 8 is in the form of an envelope or flattened bulb as shown in Figure 1. The main feature of this diaphragm is that its walls are non-resiliant. This diaphragm is mounted in the casing 5 by means of a threaded piece 1, which passes through one wall of the casing 5 and thence through one wall of the diaphragm 8, as shown in Figure 1. This piece 1 has a head 24, which lies inside the diaphragm 8 as shown in Figure 1. Upon this piece 1 is the nut 3, as also shown in Figure 1. Therefore it will be seen that if the nut 3, is tightened or adjusted upon the threaded piece 1 the diaphragm 8 will be securly mounted in the casing 5, and will be air tight, except for the hole 2 which passes through the piece 1. It will be readily understood that this hole is provided for the purpose of admitting air into the diaphragm 8. When air is forced through the air-line 38 and thence through the piece 1, the diaphragm 8 will expand under pressure of the air, and one wall thereof will bear upon the large disc 9 and move the arm 16 with its pointer 17, thus registering the amount of pressure exerted by the air so forced into the diaphragm. Inasmuch as my diaphragm 8 is very flexible, I provide the spring 20, which furnishes a resistance to the upward movement of the arm 16, and also functions to return the arm 16 to its lowermost position when the air is allowed to leave the diaphragm. I thus obtain a uniformly increasing resistance that has a very high degree of constancy, a resistance which is readily susceptible to adjustment, and which therefore, gives a very accurate registration of the amount of liquid to be measured. This cloth-like flexibility of my diaphragm 8, in connection with the separate resisting element 20, is a very important feature of my instrument.

I also provide an air-bell and an air-line common to instruments of this character, except that the cross-sectional area of my air-bell is much larger than the cross-sectional area of the air-bells usually used in this art.

My purpose in thus providing an air-bell of unusually large cross-sectional area is to enable the air-bell to receive the displacement of air from the air-line caused by a rising temperature, and vice versa, to allow for the displacement of air from the air bell into the air-line, caused by a falling temperature, without materially affecting the height of the liquid in the air-bell. In view of the fact that my air-bell has a very large cross-sectional area it is evident that a slight rise of liquid therein will give the necessary displacement of air into the diaphragm to cause a full registation by the indicating hand. I therefore, provide the spring 20 so strongly tensioned that is will keep the liquid at all times from rising more than slightly in the air-bell. This construction, consisting of an air-bell of large cross-sectional area in conjunction with a spring so strongly tensioned that it will keep the liquid in the air-bell very low prevents my device from being seriously affected by changes of temperature.

I am aware of the fact that resisting springs have been used in devices of this character, and I am also aware of the fact that some construction has been shown that incidently resulted in an air-bell of large diameter wherein the liquid would not rise to any considerable height; but I claim that my invention wherein an air-bell of very large cross-sectional area is provided, in conjunction with a spring so strongly tensioned that the liquid can not rise more than slightly in the air-bell, this combination being for the purpose of preventing error from changes of temperature is a new and valuable improvement in the art, as it makes possible a simple, efficient, economical and durable device that will register with great accuracy under all conditions regardless of changes in temperature.

When I state that my device has a spring tensioned to keep the liquid low in the air-bell, I mean that the height of the liquid in the air-bell is so low that, while the height of the liquid in the air-bell together with the resistance furnished by the spring, equal, and are at a balance with the hydraulic head of the liquid outside the air-bell, the spring furnishes by far the greater part of this resistance. This is the element that I claim to be entirely new in my device and I claim that it gives a new and very desirable result in that it overcomes error caused by changes of temperature.

I also claim to have made use of new and useful improvement in the art by providing the diaphragm 8 having walls of cloth-like flexibility and being substantially in the form of a flattened bulb.

In view of the fact that my diaphragm 8 is flexible, it will be apparent that a movable element must be provided between the arm 16 and the diaphragm 8 which element must necessarily present a considerable surface to the diaphragm. I, therefore, provide a thin disc 9 having a large diameter and having a stem 10, which is slidably mounted in the hole 34. Now by reference to Figure 1, it will be seen that the arm 16 is so mounted that it has a lower projecting bearing point 17 that rests in contact with the end of the stem 10 and it will also be seen by reference to Figure 1 that the relative length of this lower projecting part and the main body of the arm is such that a very slight movement of the stem 10 will cause a considerable movement of the indicating pointer 27. Thus it will be understood that there is never any considerable movement of the diaphragm 8.

By reference to Figure 1, it will be seen that the spring 20 functions to return the arm and indicating pointer to normal position as the air leaves the diaphragm 8. This spring also furnishes a considerable resistance to the upward movement of the arm and the tension thereof may be changed at will by turning the threaded nipple 18 to turn it in or out as desired, inasmuch as the lower end of the spring 20 is pivotally mounted in the lower end of the nipple 17 by means of the button 19. By this construction it is possible to regulate the gauge to a very high degree of accuracy regardless of the depth of the fuel tank.

We will assume that the gauge has been mounted on the dash-board of a car when the gas tank was empty. This being the case there would be no compressed air in the air-line and the tension of the spring 20 would hold the arm 16 and indicating pointer 27 to their lowermost position which would indicate an empty tank. Now if fuel is placed in the fuel tank the fuel rising in the air-bell will cause the air in the air-line 38 to go into the diaphragm 8 which in turn will cause an expanding movement of the diaphragm 8 which will move the disc 9 and stem 10 in a manner to cause the arm 16 and indicating pointer 27 to rise against the tension of the spring 20, and the indicating pointer 27 will travel along the calibrated face 26 as shown in Figure 3 and thus register the amount of fuel in the tank.

Having described my invention, what I claim as new and desire to secure by Letters Patent is:

1. A liquid level gauge comprising a casing, a diaphragm substantially in the form of two discs of flexible cloth-like material each joined directly to the other at its outer edge only, without an intervening fold, one of said walls having an opening through which air may be forced into the diaphragm, indicating means movable by one of said walls, and a resisting element arranged to resist a movement of the indicating means.

2. A liquid level gauge comprising a casing, a diaphragm mounted within the casing, the diaphragm being in the form of a flat bulb having flexible or flaccid and substantially parallel walls, each of the walls being joined directly to another at its outer edge only, one of said walls having an opening through which air may be forced into said diaphragm, indicating means mounted within the casing whereby a movement of one of said walls will move the indicating means, a resisting element comprising a spring arranged to resist a movement of the indicating means.

3. A liquid level gauge comprising a casing, a diaphragm mounted in the casing, the diaphragm being substantially in the form of a flattened bulb having two flexible parallel walls, one of said walls having an opening, a hollow piece passing through the opening and through a wall of the casing, means for adjusting the hollow piece in relation to the casing and a wall of the diaphragm whereby the diaphragm will be securely held in position and will be made air-tight, indicating means movable by one of the walls of the diaphragm, and a resisting element arranged to resist a movement of the indicating means.

4. A liquid level gauge comprising a casing, a diaphragm mounted in the casing, the diaphragm being substantially in the form of a flattened bulb having two parallel flexible walls, one of said walls having an opening through which air may be forced into said diaphragm, indicating means, a resisting element arranged to resist the movement of the indicating means, and a freely movable piece lying between a wall of the diaphragm and the indicating means, whereby a movement of a wall of the diaphragm will move the movable piece and the movable piece will move the indicating means.

5. A liquid level gauge comprising a casing, indicating means mounted within the casing, a resisting element arranged to resist a movement of the indicating means, a diaphragm having two substantially parallel walls, the indicating means being movable by one of said walls, a hollow piece penetrating one of said walls, said hollow piece having a head lying within said diaphragm, means for adjusting said head relative to a wall of the diaphragm whereby the diaphragm becomes air-tight.

6. A liquid level gauge comprising a casing, indicating means mounted in the casing, a resisting element arranged to resist a movement of the indicating means, a diaphragm having two substantially parallel walls, the indicating means being movable by one of said walls, a hollow piece penetrating one of said walls, said hollow piece having a head lying within said diaphragm and having threads whereby it may be attached to an air line, means for adjusting said hollow piece and the head thereof relative to a wall of the diaphragm.

OSCAR L. INGRAM.